United States Patent [19]

Basstein et al.

[11] Patent Number: 5,411,431
[45] Date of Patent: May 2, 1995

[54] METHOD FOR CROWN GEAR GRINDING BY GENERATION

[75] Inventors: Augustinus F. H. Basstein, Prinsenbeek; Gustaaf A. Uittenbogaart, Overveen, both of Netherlands

[73] Assignee: Crown Gear, B.V., Rotterdam, Netherlands

[21] Appl. No.: 84,272

[22] PCT Filed: Jan. 9, 1991

[86] PCT No.: PCT/NL92/00004
§ 371 Date: Jul. 8, 1993
§ 102(e) Date: Jul. 8, 1993

[87] PCT Pub. No.: WO92/11967
PCT Pub. Date: Jul. 23, 1992

[30] Foreign Application Priority Data

Jan. 9, 1991 [NL] Netherlands ................. 9100023

[51] Int. Cl.$^6$ ............................................. B24B 53/075
[52] U.S. Cl. ............................ 451/47; 451/56; 125/11.01; 125/11.04
[58] Field of Search .................. 451/47, 56, 21; 125/11.01, 11.03, 11.04

[56] References Cited

U.S. PATENT DOCUMENTS

| | | |
|---|---|---|
| 1,759,333 | 5/1930 | Wildhaber . |
| 2,304,586 | 12/1942 | Miller ........................ 29/103 |
| 2,309,530 | 1/1943 | Perkins ........................ 29/90 |
| 2,711,673 | 6/1955 | Miller ........................ 451/47 |
| 5,020,279 | 6/1991 | Abysov . |
| 5,079,877 | 1/1992 | Abysov . |

FOREIGN PATENT DOCUMENTS

| | | |
|---|---|---|
| 0348525 | 1/1990 | European Pat. Off. . |
| 0362388 | 4/1990 | European Pat. Off. . |
| 2378989 | 8/1978 | France . |
| 533736 | 9/1931 | Germany . |
| 1124786 | 1/1962 | Germany . |
| 3425800 | 1/1986 | Germany . |
| 1071620 | 3/1989 | Japan . |
| 667026 | 9/1988 | Switzerland . |
| 1586548 | 1/1978 | United Kingdom . |

*Primary Examiner*—Robert A. Rose
*Attorney, Agent, or Firm*—Deveau, Colton & Marquis

[57] ABSTRACT

Crown wheels (21) are ground on a grinding machine with the aid of a hobbing grinding disc (11) of ceramic material which is formed on the same grinding machine with the aid of a dressing crown wheel (13) with one or more teeth (14) provided with a dressing material such as diamond. The shape of said crown wheel tooth or teeth is in principle the same as the shape of the teeth of the crown wheel to be ground. The hobbing grinding disc (11) is mounted on the grinding wheel shaft (12) of the grinding machine both during its formation and during the grinding of the crown wheels, while the dressing crown wheel (13) or the crown wheel (21) to be ground is mounted on the workpiece holder (15) of the grinding machine. During the formation of the hobbing grinding disc (11) or the grinding of the crown wheels (21) the movements of the hobbing grinding disc relative to the tooth or teeth (14) of the dressing crown wheel (13) provided with a dressing material or the crown wheels (21) to be ground are in principle the same. The shape of the tooth or teeth (14) of the dressing crown wheel is consequently always transferred in the same way by means of the hobbing grinding disc to the teeth of the crown wheels to be ground. Crown wheels can be ground very accurately in this way.

6 Claims, 2 Drawing Sheets

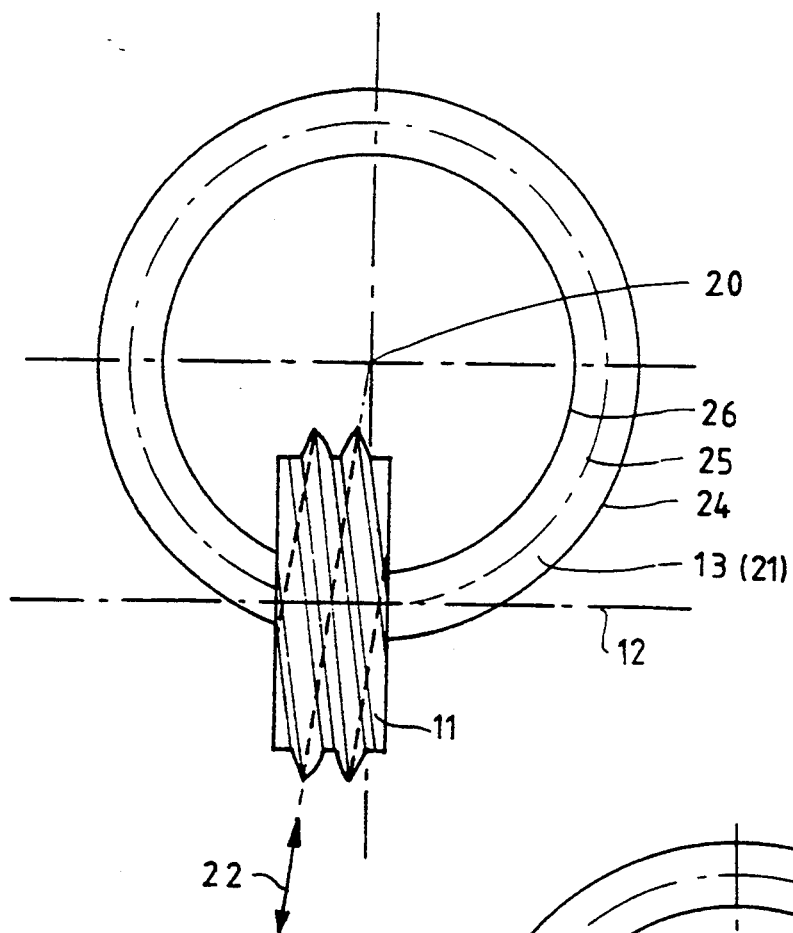
_FIG:2._
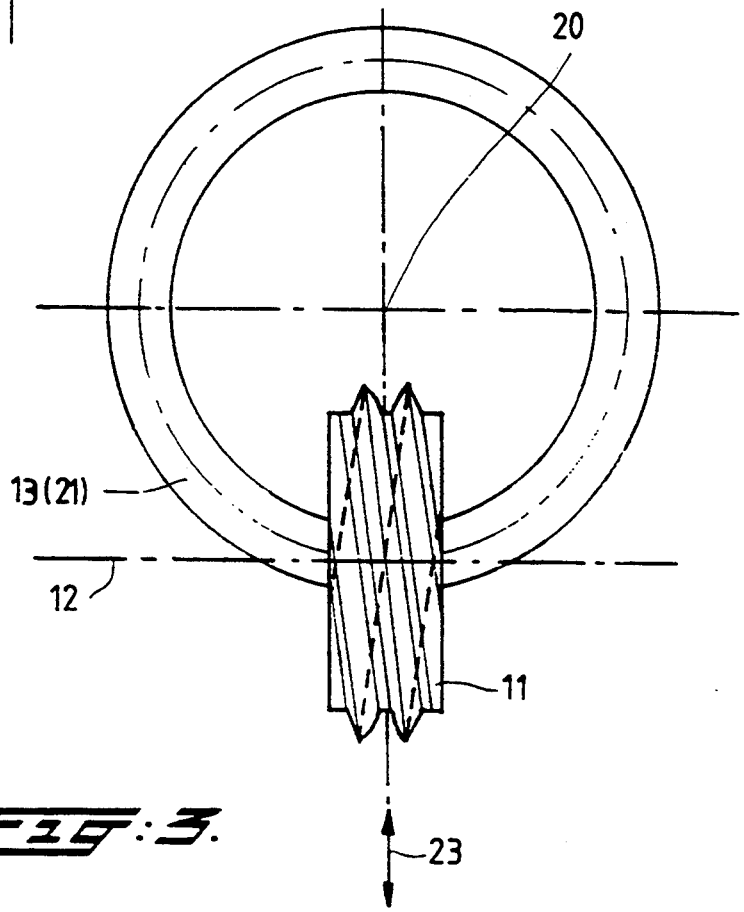
_FIG:3._

METHOD FOR CROWN GEAR GRINDING BY GENERATION

The invention relates to a method for grinding crown wheels, with the aid of a hobbing grinding disc.

Crown wheels are gear wheels which are used in angle drives with or without intersecting axes which may or may not form an angle of 90° with each other. In this drive a cylindrical pinion meshes with a crown wheel whose tooth shape is determined by the tooth shape of the cylindrical pinion, the gear ratio and the position of the gear wheels relative to each other.

The angle drive with crown wheel teeth has a number of special advantages over the bevel gear drive generally known and used, such as the absence of any need for axial adjustment of the cylindrical pinion, a greater gear ratio being achievable, and the fact that a great transverse contact ratio can be achieved without special provisions.

The absence of an economically feasible and at the same time accurate manufacturing method was, however, one of the greatest disadvantages until now for a general use of the crown wheel gearing in highly loaded constructions.

The object of the present invention is to provide a method for grinding crown wheels, by which accurate crown wheels can be obtained, and which is economically advantageous.

This object is achieved by the method for grinding crown wheels with the aid of a hobbing grinding disc, comprising the following steps:

a) forming the hobbing grinding disc as follows:
causing to rotate about its axis a previously produced grinding disc element of ceramic material whose external dimensions correspond essentially to the external dimensions of the hobbing grinding disc to be formed, and which is mounted on the grinding wheel shaft of a grinding machine;
rotating at least one crown wheel tooth mounted on the rotary workpieceholder of the grinding machine, which tooth is in principle the same shape as the teeth of a crown wheel to be ground and is of such length that the crown wheel tooth contains at least all pressure angles which are present on the teeth of the crown wheel to be ground, while the surface of the crown wheel tooth is provided with a dressing material, and the crown wheel tooth is mounted in such a way on the workpieceholder that the axis of a crown wheel of which the crown wheel tooth could form part coincides with the axis of rotation of the workpieceholder;
the axes of rotation of the grinding disc element and the workpieceholder, and thus of the crown wheel tooth, intersecting each other at right angles;
and the speeds of rotation of the grinding disc element and of the crown wheel tooth being such that per revolution of the grinding disc element the crown wheel tooth rotates over one or more tooth pitches about the axis of the workholder;
positioning relative to each other and moving the rotating grinding disc element and the rotating crown wheel tooth in such a way that the crown wheel tooth works the peripheral surface of the rotating grinding disc element, while the crown wheel tooth comes into contact over its entire length and height with the grinding disc element, and a hobbing grinding disc with an essentially helical peripheral profile of a shape required for grinding the crown wheel is formed;

b) with the thus formed hobbing grinding disc, grinding the crown wheel mounted on the earlier mentioned workpieceholder, the hobbing grinding disc and the crown wheel being rotated and moved relative to each other in principle in the same way as the grinding disc element and the earlier mentioned crown wheel tooth during the formation of the hobbing grinding disc;

c) resharpening (dressing) the hobbing grinding disc when it has become blunt, using the crown wheel tooth provided with a dressing material and mounted on the workpieceholder, in the same way as forming of the hobbing grinding disc.

Due to the fact that the hobbing grinding disc is formed on the same grinding machine as that on which the crown wheel to be ground is ground, while the grinding disc always remains mounted on the grinding wheel shaft of the machine and the crown wheel tooth for forming or sharpening the hobbing grinding disc and the crown wheel to be ground are mounted on the same workpieceholder, crown wheels with very great accuracy can be obtained more cheaply.

The invention will be explained in greater detail in the description of a preferred embodiment of the method according to the invention which follows, with reference to the appended drawing.

FIG. 2 shows a top view of the device of FIG. 1.

FIG. 3 shows a top view similar to FIG. 2, with a slightly modified mutual arrangement of the elements compared with FIG. 2.

For carrying out the method for grinding crown wheels according to the invention, a grinding disc element is formed beforehand from ceramic material, from which element a hobbing grinding disc can be formed, and of which the external dimensions correspond essentially to the external dimensions of the hobbing grinding disc to be formed.

At least one crown wheel tooth is also formed, the surface of which is provided with a dressing material, for example it is set with diamond or cubic boron nitride (CBN), and which is subsequently of such shape that it can mesh with a pinion which can mesh with a crown wheel ground with the hobbing grinding disc to be formed. This crown wheel tooth is in principle the same shape as the teeth of the crown wheel to be ground and is of such length that the crown wheel tooth contains all pressure angles present in the crown wheel to be ground.

The crown wheel tooth can form part of a dressing crown wheel with teeth provided with a dressing material.

Figure 1:
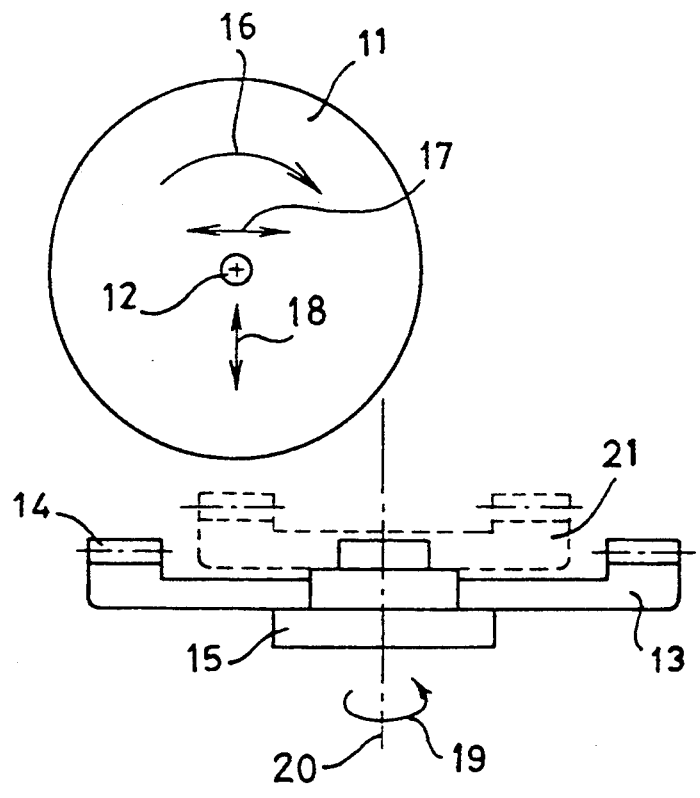
FIG. 1 shows very schematically a device for grinding crown wheels according to the invention.

The grinding disc element 11 is mounted on the grinding wheel shaft 12 of a grinding machine, as indicated in FIG. 1. The crown wheel tooth provided with a dressing material, or as shown in FIG. 1, a dressing crown wheel 13 with the teeth 14 provided with a dressing material, is mounted on the workpieceholder 15 of the grinding machine which is rotatable about the axis 20. The grinding disc element 11 is then rotated about the grinding wheel shaft 12 (arrow 16), and the crown wheel tooth provided with a dressing material, or the dressing crown wheel 13, is rotated about the axis 20 of the workpieceholder 15 (arrow 19), while per revolution of the grinding disc element 11 the crown wheel tooth provided with a dressing material, or the dressing crown wheel 13, rotates over one or more tooth pitches about the axis 20 of the workpieceholder 15. The rotating grinding disc element 11 and the crown wheel tooth provided with a dressing material, or the dressing crown wheel 13, are positioned and moved in such a way relative to each other (arrows 17, 18) that one or more dressing crown wheel teeth 14 work the peripheral surface of the rotating grinding disc element. It is ensured here that a dressing crown wheel tooth 14 comes into contact with the grinding disc element 11 over its entire length and height. In this way a hobbing grinding disc with an essentially helical peripheral profile, and having a required shape for grinding a crown wheel, is formed. When the hobbing grinding disc is completed it is, for example, the shape described and illustrated in international application PCT/NL91/00245 (not a prior publication) of applicant.

With the hobbing grinding disc formed, a crown wheel 21 mounted on the workpieceholder of the grinding machine is ground. In this case the hobbing grinding disc and the crown wheel 21 to be ground are in principle rotated and moved relative to each other in the same way as the grinding disc element 11 and the crown wheel tooth provided with a dressing material, or the dressing crown wheel 13, during formation of the hobbing grinding disc. The position of the crown wheel 21 relative to the workpieceholder 15 is fixed (for example through use of a keyed connection), as is the position of the crown wheel tooth provided with a dressing material, or the dressing crown wheel 13, relative to the workpieceholder.

When the hobbing grinding disc has become blunt, for example after grinding a number of crown wheels, the hobbing grinding disc is resharpened (dressed) using the crown wheel tooth provided with a dressing material, or the dressing crown wheel 13. This takes place in the same way as the formation of the hobbing grinding disc. Thereafter, a number of crown wheels 21 can be ground again, which wheels then acquire exactly the same tooth shape as the previous series of crown wheels.

During the formation or resharpening of the hobbing grinding disc or the grinding of a crown wheel 21, the grinding disc element 11 or the hobbing grinding disc can be moved, according to the direction of the helix of the peripheral profile formed or to be formed, relative to the crown wheel tooth provided with a dressing material, or the dressing crown wheel 13, mounted on the workholder 15 or the crown wheel 21 mounted for grinding on the workholder, as shown schematically in FIG. 2. The feed direction is indicated by arrow 22 in FIG. 2.

The cross-sections of the helical profile of the hobbing grinding disc are in this case the shape described and shown in the earlier mentioned international application PCT/NL91/00245, the curved parts of the outer contour of the cross-sections being an involute shape.

In this case the number of teeth of the dressing crown wheel 13 of which the crown wheel tooth or teeth 14 provided with a dressing material form part or could form part can be equal to or greater than the number of teeth of the crown wheel 21 to be ground with the hobbing grinding disc formed. The condition is that all pressure angles present on the teeth of the crown wheel to be ground are also present on the crown wheel tooth or teeth 14 provided with a dressing material.

It is, however, also possible, for forming or resharpening the hobbing grinding disc or grinding a crown wheel 21, for the grinding disc element 11 or the hobbing grinding disc to be moved, in a direction at right angles to the axis of rotation of the grinding disc element or the hobbing grinding disc, relative to the crown wheel tooth provided with a dressing material, or the dressing crown wheel 13, mounted on the workholder or the crown wheel 21 mounted for grinding on the workholder, as shown schematically in FIG. 3. The feed direction is indicated by arrow 23 in FIG. 3.

In this case the cross-section of the helical profile of the hobbing grinding disc is in fact essentially the shape described and shown in the earlier mentioned international application PCT/NL91/00245, but the curved parts of the outer contour of the cross-section are not an involute shape now. The precise shape here is not important, since the shape of the crown wheel tooth or teeth provided with a dressing material is passed on precisely by the hobbing grinding disc formed with this (these) crown wheel tooth (teeth) to the teeth of the crown wheel 21 to be ground. The number of teeth of the dressing crown wheel 13 must then be equal to the number of teeth of the crown wheel 21 to be ground with the hobbing grinding disc formed.

The situation shown in FIG. 3 is a special case of the more general situation in which the feed direction 23 of the grinding disc element or the hobbing grinding disc deviates within an angle range of about 10° from the direction of the helix of the peripheral profile formed or to be formed. In FIG. 2, as already mentioned, the feed direction 22 corresponds to the direction of the helix.

Crown wheels with radially directed teeth can be ground with the method according to the invention. The feed movement of the grinding disc element 11 or the hobbing grinding disc is then directed towards the axis of rotation 20 of the workholder 15, and thus also of the crown wheel tooth provided with a dressing material, or the dressing crown wheel 13, or of the crown wheel 21 to be ground (arrow 22 and arrow 23 in FIGS. 2 and 3 respectively).

It is also possible to grind crown wheels with offset teeth by the method according to the invention. The feed movement of the grinding disc element 11 or the hobbing grinding disc is then directed towards a point which lies staggered over a certain distance next to the axis of rotation 20 of the workpieceholder 15.

Figure 4:
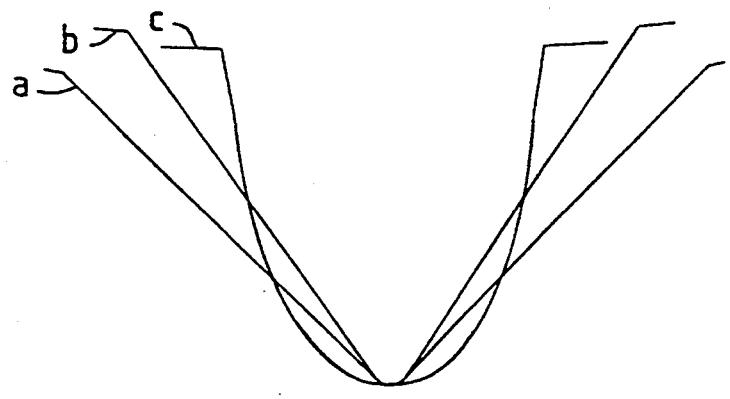
FIG. 4 shows different cross-sections of a tooth space of a ground crown wheel.

It has surprisingly been found that crown wheel teeth of widely varying cross-section over the length of the teeth can be ground with very great accuracy and more cheaply by the method according to the invention. By way of illustration, FIG. 4 shows the cross-section of a tooth space of a crown wheel at the position of the outside diameter 24 (FIGS. 2, 3) of the crown wheel (curve a), at the position of the mean diameter 25 (curve b), and at the position of the inside diameter 26 (curve c). It can be seen in FIG. 4 that the teeth are sharply undercut at the position of the inside diameter.

We claim:

1. Method for grinding crown wheels, with the aid of a hobbing grinding disc, comprising the following steps:
    a) forming the hobbing grinding disc as follows:
        causing to rotate about its axis a previously produced grinding disc element of ceramic material whose external dimensions correspond essentially to the external dimensions of the hobbing grinding disc to be formed, and which is mounted on the grinding wheel shaft of a grinding machine;

rotating at least one crown wheel tooth mounted on the rotary workpieceholder of the grinding machine, which tooth is in principle the same shape as the teeth of a crown wheel to be ground and is of such length that the crown wheel tooth contains at least all pressure angles which are present on the teeth of the crown wheel to be ground, while the surface of the crown wheel tooth is provided with a dressing material, and the crown wheel tooth is mounted in such a way on the workholder that the axis of a crown wheel of which the crown wheel tooth could form part coincides with the axis of rotation of the workpieceholder;

the axes of rotation of the grinding disc element and the workpieceholder, and thus of the crown wheel tooth intersecting each other at right angles;

and the speeds of rotation of the grinding disc element and of the crown wheel tooth being such that per revolution of the grinding disc element the crown wheel tooth rotates over one or more tooth pitches about the axis of the workholder;

positioning relative to each other and moving the rotating grinding disc element and the rotary crown wheel tooth in such a way that the crown wheel tooth works the peripheral surface of the rotating grinding disc element, while the crown wheel tooth comes into contact over its entire length and height with the grinding disc element, and a hobbing grinding disc with an essentially helical peripheral profile of a shape required for grinding the crown wheel is formed;

b) with the thus formed hobbing grinding disc, grinding the crown wheel mounted on the earlier mentioned workpieceholder, the hobbing grinding disc and the crown wheel being rotated and moved relative to each other in principle in the same way as the grinding disc element and the earlier mentioned crown wheel tooth during the formation of the hobbing grinding disc;

c) resharpening (dressing) the hobbing grinding disc when it has become blunt, using the crown wheel tooth provided with a dressing material and mounted on the workpieceholder, in the same way as forming of the hobbing grinding disc.

2. Method according to claim 1, in which the grinding disc element or the hobbing grinding disc is moved in a direction, according to the direction of the helix of the peripheral profile formed or to be formed, relative to the crown wheel tooth provided with a dressing material, or the crown wheel mounted for grinding on the workpieceholder.

3. Method according to claim 2, in which the crown wheel tooth provided with a dressing material forms part of or can form part of a dressing crown wheel of which the number of teeth is equal to or greater than the number of teeth of the crown wheel to be ground with the hobbing grinding disc.

4. Method according to claim 1, in which the grinding disc element or the hobbing grinding disc is moved in a direction which deviates less than 10° from the direction of the helix of the peripheral profile formed or to be formed relative to the crown wheel tooth provided with a dressing material and mounted on the workpieceholder, or the crown wheel mounted for grinding on the workpieceholder.

5. Method according to claim 1, in which the grinding disc element or the hobbing grinding disc is moved, in a direction at right angles to the axis of rotation of the grinding disc element or the hobbing grinding disc, relative to the crown wheel tooth provided with a dressing material or the crown wheel mounted for grinding on the workpieceholder.

6. Method according to claim 4 or 5, in which the crown wheel tooth provided with a dressing material forms part or can form part of a dressing crown wheel of which the number of teeth is equal to the number of teeth of the crown wheel to be ground with the hobbing grinding disc.

* * * * *

UNITED STATES PATENT AND TRADEMARK OFFICE
CERTIFICATE OF CORRECTION

PATENT NO. : 5,411,431
DATED      : May 2, 1995
INVENTOR(S) : Basstein, et al.

It is certified that error appears in the above-indentified patent and that said Letters Patent is hereby corrected as shown below:

On the title page item [22], delete

"Jan. 9, 1991" and replace it with --Jan. 9, 1992--.

Signed and Sealed this

Twenty-ninth Day of August, 1995

Attest:

BRUCE LEHMAN

*Attesting Officer*             *Commissioner of Patents and Trademarks*